(12) United States Patent
Luo

(10) Patent No.: US 7,031,549 B2
(45) Date of Patent: Apr. 18, 2006

(54) SYSTEMS AND METHODS FOR ENHANCING TONE REPRODUCTION

(75) Inventor: Huitao Luo, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 650 days.

(21) Appl. No.: 10/080,890

(22) Filed: Feb. 22, 2002

(65) Prior Publication Data

US 2003/0161547 A1 Aug. 28, 2003

(51) Int. Cl.
*G06K 9/40* (2006.01)

(52) U.S. Cl. .................. 382/264; 382/254; 382/257; 358/3.21; 358/3.27

(58) Field of Classification Search .............. 382/173, 382/180, 251, 254, 257, 260–264, 270–275; 348/607, 618, 619; 358/3.21, 3.24, 3.27, 358/447; 708/300
See application file for complete search history.

(56) References Cited

U.S. PATENT DOCUMENTS

| | | | | |
|---|---|---|---|---|
| 5,619,592 A | * | 4/1997 | Bloomberg et al. | 382/175 |
| 5,724,454 A | * | 3/1998 | Shimazu et al. | 382/258 |
| 5,978,497 A | * | 11/1999 | Lee et al. | 382/133 |
| 5,987,169 A | * | 11/1999 | Daly et al. | 382/167 |
| 6,064,776 A | * | 5/2000 | Kikuchi et al. | 382/260 |
| 6,085,152 A | * | 7/2000 | Doerfel | 702/3 |
| 6,487,321 B1 | * | 11/2002 | Edgar et al. | 382/260 |

FOREIGN PATENT DOCUMENTS

JP 2000310987 A * 11/2000

OTHER PUBLICATIONS

English abstract of JP2000310987.*
Moroney, Nathan, "Local Color Correction Using Non-Linear Masking," 2000 IS&T/SID 8th Color Imaging Conference, pp. 108-111, (Provided as part of the IDS.).*
Digital Image Processing, 1st ed. (1993) by Gonzalez and Woods; pp. 191-192.*
Moroney, Nathan. "Local Color Correction Using Non-Linear Masking," IS&T/SID Eighth Color Imaging Conference. (2000) pp. 108-111.
Larson, Gregory W. et al. "Visibility Matching Tone Reproduction Operator fro High Dynamic Range Scenes," Regents of University of California. (Jan. 15, 1997) pp. 1-35.
Chiu, K. et al. "Spatially Nonuniform Scaling Functions for High Contrast Images," Proceedings of Graphic Interface. (May 1993) pp. 1-9.
Rowley, H.A. et al. "Neural Network-Based Face Detection," PAMI. (Jan. 1998) pp. 1-27.

(Continued)

*Primary Examiner*—Kanjibhai Patel
*Assistant Examiner*—Yubin Hung

(57) ABSTRACT

The present invention is related to a method for processing a digital image, wherein the digital image comprises at least a gray-scale component. The method may comprise: morphologically filtering the grayscale component to produce a segmentation result; low-pass filtering the gray-scale component under control of at least the segmentation result to produce an image mask; and enhancing tone reproduction of the digital image utilizing at least the image mask.

22 Claims, 2 Drawing Sheets

OTHER PUBLICATIONS

Heijmans, H. "Mathematical Morphology: A Modern Approach in Image Processing Based on Algerbra and Geometry," SIAM Review, vol. 37, No. 1. (Mar. 1995) pp. 1-36.

Peters, II R. A. "A New Algorithm for Image Noise Reduction using Mathematical Morphology," IEEE Transactions on Image Processing, vol. 4, No. 3. (May 1995) pp. 1-30.

* cited by examiner

SYSTEMS AND METHODS FOR ENHANCING TONE REPRODUCTION

FIELD OF THE INVENTION

The present invention is, in general, related to computer graphics and, more particularly, to systems and methods for processing a digital image.

BACKGROUND OF THE INVENTION

Tone reproduction is an important issue in digital image enhancement. Tone reproduction relates to the representation of brightness and darkness in a digital image and the relationship of the representation to the original image. Tone reproduction is associated with several difficulties. Brightness and darkness are not always accurately represented in a captured digital image. Imaging circuitry utilized to capture the digital image may have several limitations. For example, the imaging circuitry may inject noise into the digital information or may present other non-linearities in the image capturing process.

Accordingly, techniques have been developed to improve the quality of tone reproduction. Two types of approaches are currently utilized: global mapping and local adaptive tone correction. Global mapping is a relatively straightforward algorithm. However, its effectiveness is limited when applied to digital images that possess a high dynamic range. Local adaptive methods are generally utilized to enhance the tone reproduction of digital images that exhibit high dynamic ranges. Local adaptive algorithms seek to change a scaling factor based on local image features. For example, Chiu et al. proposed a non-uniform scaling function for rendering high dynamic range computer graphics in "Spatially non-uniform scaling functions for high contrasts images," *Proceedings of Graphics Interface '93*, 1993. Moroney disclosed an image mask based tone correction algorithm for digital photographs in "Local color correction using non-linear masking," *IS&T SID 8th Color Imaging Conference*, 2000. Although these algorithms are based on research of human eye behaviors, these algorithms produce noticeable gradient reversals known as a "halo effect."

According to Moroney, low-pass filtering of an image is useful to avoid excessively reducing the image contrast. This is true in smooth image regions and in regions with slowly changing brightness. However, at high grayscale gradient regions, the blurred image mask produces a partially reversed band along the edges. This band becomes noticeable when one or both sides of the edge are large and smooth regions and, hence, gives rise to the halo effect.

To address the halo effect, a histogram adjustment algorithm based on human contrast sensitivity was proposed by Larson et al. in "A visibility matching tone reproduction operator for high dynamic range scenes," *IEEE Transactions on Visualization and Computer Graphics*, vol. 3, no. 4, 1997. This algorithm overcomes the halo effect problem successfully, but it assumes that the actual brightness at each pixel location is known. This assumption is true for computer-created graphical images. However, this assumption is not true for digital images captured via digital photography. Accordingly, this algorithm is useful for only a limited subset of digital images.

BRIEF SUMMARY OF THE INVENTION

In one embodiment, the present invention is related to a method for processing a digital image, wherein the digital image comprises at least a gray-scale component. The method may comprise: morphologically filtering the gray-scale component to produce a segmentation result; low-pass filtering the gray-scale component under control of at least the segmentation result to produce an image mask; and enhancing tone reproduction of the digital image utilizing at least the image mask.

DETAILED DESCRIPTION OF THE INVENTION

Figure 1:
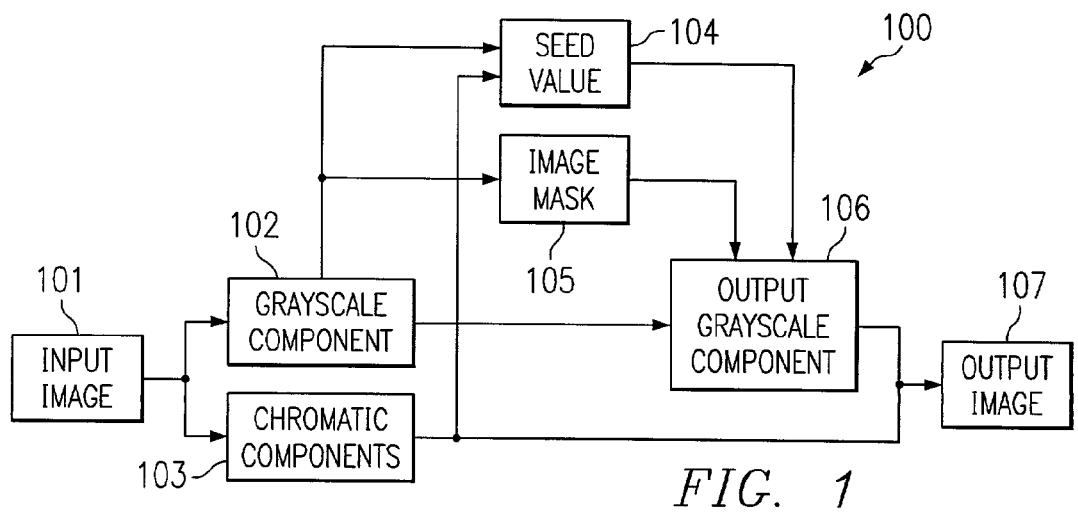
FIG. 1 illustrates processing of data structures according to embodiments of the present invention.

Referring now to the drawings, FIG. 1 depicts flowchart 100 that illustrates processing of data structures according to embodiments of the present invention. Input image 101 is received from, for example, a digital camera. Input image 101 may be a grayscale image or a chromatic image. Any number of encoding formats may be utilized to represent input image including, but not limited to, red/green/blue (RGB), Joint Photographic Experts Group (JPEG), graphics interchange format (GIF), Portable Network Graphics (PNG), and/or the like. Embodiments of the present invention are described as processing an image that is based upon the CIELAB color space which was developed by Commission Internationale de l'Eclairage (CIE). The tone reproduction enhancement is applied to the "L" component of the CIELAB image data structure while the "a*" and "b*" components may remain unmodified. However, it shall be appreciated that the present invention is not limited to any particular digital image representation or protocol.

If input image 101 is a chromatic image, input image 101 is separated into grayscale component 102 and chromatic component 103. Grayscale component 102 is advantageously quantized and morphologically filtered to produce image mask 105 as will be discussed in greater detail below. Seed value 104 is calculated from grayscale component 102 and chromatic component 103. Seed value 104 is used to control the global strength of the tone correction.

Output grayscale component 106 and chromatic component 103 are utilized to produce output image 107. Output image 107 may be encoded utilizing any number of suitable protocols for storage, communication, or further processing as desired for a particular application.

In accordance with embodiments of the present invention, seed value 104 may be selected utilizing automatic and/or manual methods. For example, a scroll bar at the bottom of a user interface may be utilize to allow the user to increase or decrease the global strength of the tone correction. Additionally or alternatively, a face detection algorithm may be utilized to detect an appropriate region of interest (ROI) within the image (see, for example, Henry A. Rowley, Shumeet Baluja, and Takeo Kanade, "Neural Network-Based Face Detection," *IEEE Transactions on Pattern Analysis and Machine Intelligence*, vol. 20, no. 1, pages 23–38, January 1998), which is incorporated herein by reference. The contrast between the ROI and the rest of the image may be measured and used as the indicator for the desired strength of the tone correction. Specifically, if the measured contrast is high, seed value 104 should be set to a relatively high value.

The design of image mask 105 attempts to balance two goals according to embodiments of the present invention. First, the design may advantageously be such that local image features are removed from the image mask to avoid reducing the image features in later processing. Second, salient image features, such as strong edges across large image regions, may be advantageously maintained to avoid the creation of the halo effect. In accordance with embodiments of the present invention, morphological filtering is utilized to implement these two goals.

Figure 2:
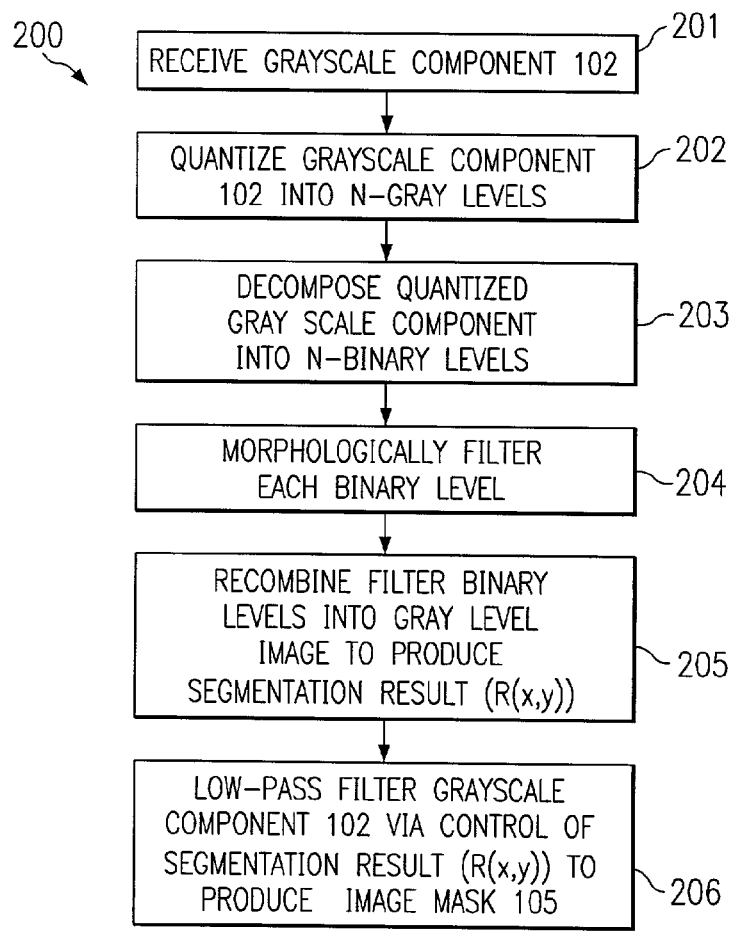
FIG. 2 is a flowchart associated with creation of an image mask according to embodiments of the present invention.

FIG. 2 depicts exemplary flowchart 200 that illustrates the creation of image mask 105 according to embodiments of the present invention. In step 201, grayscale component 102 is received. In step 202, quantization of grayscale component 102 may occur. Quantization advantageously reduces the number of gray levels of the original image to "n-levels." Quantization reduces the complexity of the filtering operations which will be discussed below. In accordance with embodiments of the present invention, two hundred fifty-six (256) gray levels may be present in grayscale component 102. Quantization may reduce the number of gray levels to six (6) gray levels (i.e., n=6). The quantization may utilize any suitable quantization algorithm. For example, the Lloyd-MAX algorithm may be employed utilizing a histogram representation of the original gray levels.

In step 203, the quantized grayscale component is decomposed into binary images. A binary image may created on the basis of points in the quantized gray scale image that are greater than a grayscale threshold. Specifically, let $I(x,y)$ denote the quantized grayscale image and $t_1 \in R$ (where $t_i$ is preferably one of the quantization levels) denote the grayscale threshold for a respective binary image, the respective binary image ($B_i(x,y)$) may be defined as:

$$B_i(x, y) = \begin{cases} 0 & \text{if } I(x, y) \leq t_1 \\ 1 & \text{if } I(x, y) > t_i \end{cases}$$

In step 204, the binary images are morphologically filtered. Morphological filtering is based on the theoretic foundation of set theory and the mathematical theory of order as is described in greater detail in, for example, "Mathematical Morphology: A Modern Approach in Image Processing Based on Algebra and Geometry," *SIAM Review*, Vol. 37, No. 1, pp. 1–36 (March 1995) by Henk J. A. M. Heijmans, which is incorporated herein by reference. Morphological filtering applies filtering operations to a set (e.g., a set of pixels) with a structuring element. Morphological filters are non-linear and are operable to increase the subjective quality of digital images. A dilation operation and an erosion operation are the two basic operations of morphological filtering. Qualitatively, a dilation operation is operable to cause enlargement of "dark" objects and an erosion operation is operable to cause enlargement of "light" objects.

Opening and closing operations are two other operations frequently utilized in morphological filtering. An open operation is an erosion operation followed by a dilation operation. A close operation is a dilation operation followed by an erosion operation. It shall be appreciated that a dilation operation followed by an erosion operation does not produce the original image, because the operations are non-linear. Likewise, an erosion operation followed by a dilation operation does not produce the original image for the same reason. Instead, the first operation tends to predominate due to the non-linearity of the operations.

In accordance with embodiments of the present invention, open and close operations are used to perform the morphological filtering. A binary image $B_i(x,y)$ contains a foreground set F (e.g., the "ones" of the binary image) and a background set $F^C$ (e.g., the "zeros" of the binary image) where $F^C$ is the complement of F. For the foreground set, the area open operation is denoted by "F∘s". The area open operation removes all connected regions with area less than s (e.g., an eight-connection criterion may be utilized). The area close operation "F•s" is the area open operation on the complementary set (i.e. F•s equals $F^C$∘s).

The morphological filtering is applied to each binary image $B_i(x,y)$. That is, an open operation may be applied to each binary image followed by a close operation applied to each binary image. Other filtering operations may be additionally or alternatively applied. For example, a close operation may be applied to each binary image followed by an open operation applied to each binary image. The closing and opening operations are operable to adjust the geometrical contours of objects in the digital image. The filtered binary images may be represented as follows:

$$B'_i(x,y)=(B_i(x,y)\circ s)\bullet s$$

In step 205, the filtered binary images $B'_i(x,y)$ are recombined to produce segmentation result $(R(x,y))$. Segmentation result $(R(x,y))$ may be formulated as:

$$R(x,y)=\max\{i \; t_i:B'_i(x,y)=1\}$$

Accordingly, after quantization and morphological filtering, the image is simplified while retaining salient features across large regions of the image. From another perspective, a segmentation of the original image is created. Specifically, small or localized image features are removed while salient image features across large regions are retained. In operation, this segmentation tends to create "pseudo" boundaries at image regions with gradually changing grayscales due to the grayscale quantization. To address this issue, instead of using segmentation result $(R(x,y))$ directly as the image mask, segmentation result $(R(x,y))$ is used to control a low-pass filtering operation to produce image mask 105 (step 206). In this manner, the low-pass filtering advantageously causes the filtering to occur across regions with lower contrast while avoiding filtering across regions with higher contrast. In this manner, low-pass filtering provides tone reproduction enhancement without creation of the halo effect.

To describe the low-pass filtering operation in greater detail, it is appropriate to reiterate several terms and to define several new terms. As previously noted, $I(x,y)$ represents grayscale image 102 and $R(x,y)$ represents the segmentation result. Let $w(x,y)$ represent a two-dimensional low-pass filter kernel. $N(x,y)$ denotes the support of the lowpass filter (i.e. it defines the area over which the low-pass filter will operate for a particular pixel $(x,y)$). For each pixel $(x_0, y_0)$, its neighborhood may be classified into two groups: a peer group defined as:

$$N_p(x_0,y_0)=\{(x,y)|R(x,y)=R(x_0,y_0) \text{ and } (x,y)\in N(x_0,y_0)\}$$

and a non-peer group defined as:

$$N_n(x_0,y_0)=\{(x,y)|R(x,y)\neq R(x_0,y_0) \text{ and } (x,y)\in N(x_0,y_0)\}$$

The average grayscale value is calculated over these groups respectively as:

$$I_p(x,y) = \frac{\sum_{(x,y)\in Np(x_0,y_0)} I(x,y) \cdot w(x-x_0, y-y_0)}{\sum_{(x,y)\in Np(x_0,y_0)} w(x-x_0, y-y_0)}$$

$$I_n(x,y) = \frac{\sum_{(x,y)\in Nn(x_0,y_0)} I(x,y) \cdot w(x-x_0, y-y_0)}{\sum_{(x,y)\in Nn(x_0,y_0)} w(x-x_0, y-y_0)}$$

By using the segmentation result (R(x,y)), embodiments of the present invention are operable to control the low-pass filtering upon the basis of which region a pixel (x,y) belongs. Specifically, if $R(x_1,y_1)=R(x_2,y_2)$, then $(x_1,y_1)$ and $(x_2,y_2)$ belong to the same region.

Figure 3:
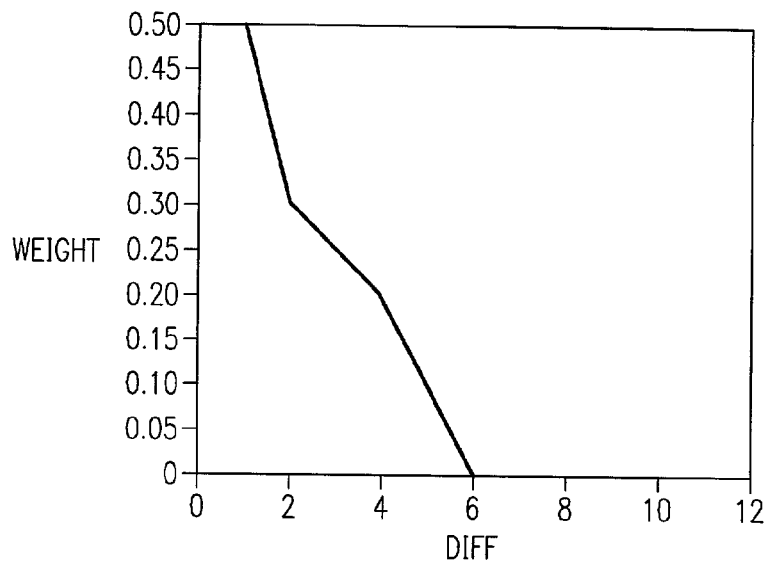
FIG. 3 depicts a weight curve according to embodiments of the present invention.

The contribution of the non-peer group $I_n(x,y)$ to the filtering result is then determined by:

$$diff(x,y)=|I_p(x,y)-I_n(x,y)|/d,$$

wherein d is a value utilized to quantize the contrast (e.g., d=30 in embodiments of the present invention). Moreover, a weighting function (designated as α) may be defined as follows:

$$\alpha(x,y)=weight\ (diff(x,y)),$$

where the weighting function may be implemented utilizing a look-up table (LUT) as depicted in FIG. 3 in accordance with embodiments of the present invention. The values of the LUT may be tuned on an empirical basis.

Then, image mask 105 (designated as M(x,y)) is given by:

$$M(x,y) = \frac{(I_p(x,y) \cdot w_p(x,y) \cdot (1-\alpha(x,y)) + I_n(x,y) \cdot w_n(x,y) \cdot \alpha(x,y))}{(w_p(x,y) \cdot (1-\alpha(x,y)) + w_n(x,y) \cdot \alpha(x,y))},$$

where $w_p(x,y)=\Sigma_{(x,y)\in Np(x,y)}w(x-x_0,y-y_0)$ and $w_n(x,y)=\Sigma_{(x,y)\in Nn(x,y)}w(x-x_0,y-y_0)$.

In accordance with embodiments of the present invention, image mask 105 (M(x,y)) and seed value 104 (S) may be utilized to perform tone reproduction enhancement of grayscale component 102 (I(x,y)) as follows:

$$O(x,y) = 255 \cdot \left(\frac{I(x,y)}{255}\right)^{\left[S^{\frac{M(x,y)-128}{128}}\right]},$$

where O(x,y) is output grayscale component 106.

Output grayscale component 106 is provided enhanced tone reproduction. Output grayscale component 106 exhibits relatively smooth variation of tone between relatively large regions. Accordingly, the perceived quality of output grayscale component 106 is appreciably increased. However, the control of the low-pass filtering by the segmentation result prevents the creation of the halo effect thereby enhancing the quality of the processed image.

Figure 4:
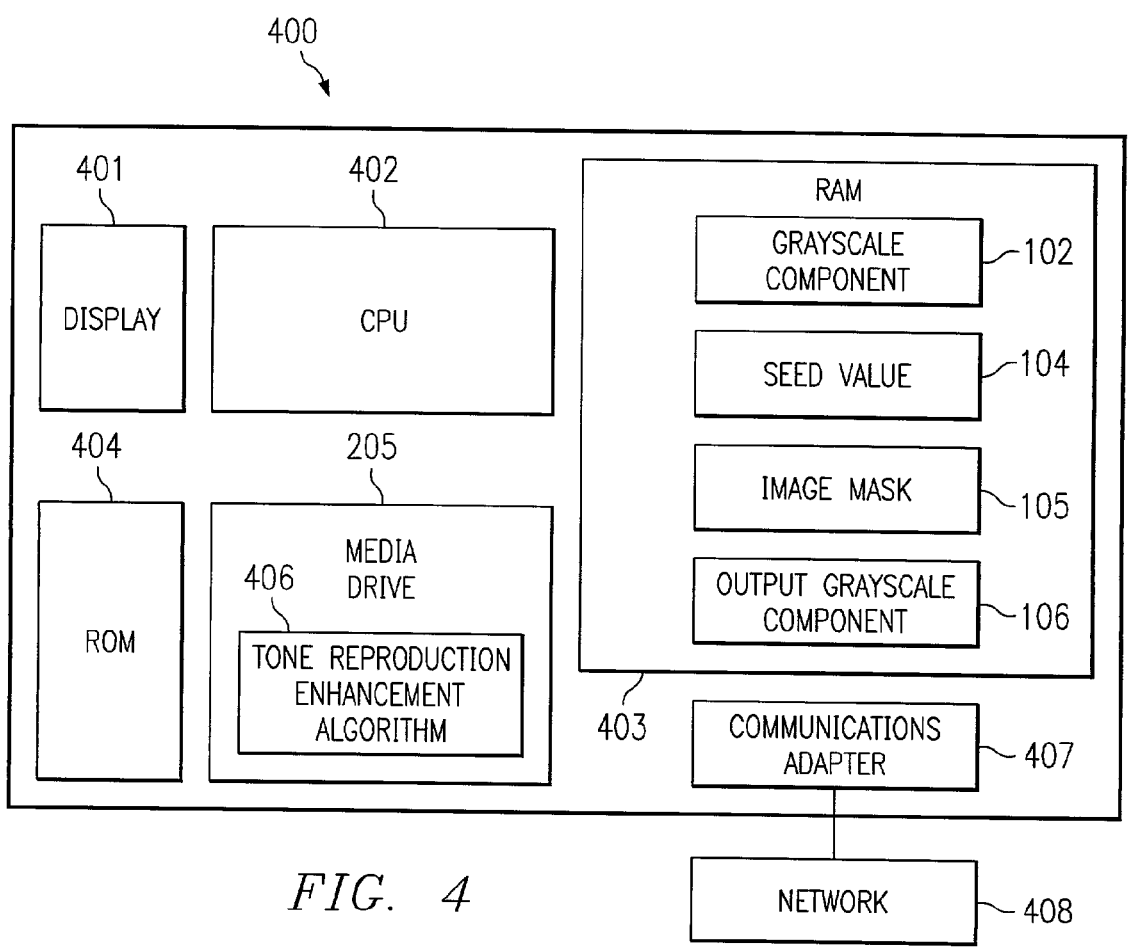
FIG. 4 depicts an exemplary system that may be used to implement embodiments of the present invention.

FIG. 4 depicts a block diagram of exemplary computer system 400 to implement embodiments of the present invention. System 400 includes display 401 to present graphical information to a user. System 400 further includes central processing unit (CPU) 402 to execute software instructions. CPU 402 may be any general purpose CPU and the present invention is not restricted by the architecture of CPU 402 as long as CPU 402 supports the inventive operations as described herein.

Computer system 400 also includes random access memory (RAM) 403, which may be SRAM, DRAM, SDRAM, or the like. Computer system 400 includes ROM 404 which may be PROM, EPROM, EEPROM, or the like. RAM 403 and ROM 404 hold user and system data and programs as is well known in the art.

When implemented via executable instructions, various elements of the present invention are in essence the code defining the operations of such various elements. The executable instructions or code may be obtained from a readable medium (e.g., hard drive media, optical media, PROM, EPROM, EEPROM, tape media, cartridge media, and/or the like) or communicated via a data signal from a communication medium (e.g., the Internet). In fact, readable media can include any medium that can store or transfer information.

For example, embodiments of the present invention store executable instructions or code to define tone reproduction algorithm 406 in accordance with embodiments of the present invention. For example, CPU 402 under the control of the executable instructions may process grayscale component 102 utilizing seed value 104 and image mask 105 to produce output grayscale component 106.

Furthermore, computer system 400 comprises communications adapter 407 which is adapted to couple computer system 400 to a network 408, which may be one or more of a telephone network, local (LAN) and/or wide-area (WAN) network, Ethernet network, and/or Internet network. Computer system 400 may communicate a tone reproduction enhanced image to another system according to embodiments of the present invention.

It shall be appreciated that embodiments of the present invention are not limited to any particular system architecture. Embodiments of the present invention may be implemented utilizing any suitable processor-based or logic-based device that is capable of processing a digital image. For example and without limitation, embodiments of the present invention may be implemented in a digital camera, personal data assistant (PDA), or any other processing device.

The invention claimed is:

1. A method for processing a digital image, wherein said digital image comprises at least a gray-scale component and a chromatic component, comprising:
   morphologically filtering said grayscale component to produce a segmentation result;
   low-pass filtering said gray-scale component under control of at least said segmentation result to produce an image mask; and
   enhancing tone reproduction of said digital image utilizing at least said image mask and said chromatic component.

2. The method of claim 1 further comprising:
   quantizing said grayscale component before morphologically filtering said grayscale component.

3. The method of claim 1 further comprising:
   decomposing said grayscale component into a plurality of binary images.

4. The method of claim 3 wherein said morphologically filtering said grayscale component comprises morphologically filtering each of plurality of binary images.

5. The method of claim 1 wherein said low-pass filtering operates on an area of pixels defined by a filter kernel.

6. The method of claim 5 wherein said low-pass filtering is operable to calculate a first average value over a peer group, wherein said peer group is each pixel within said filter kernel that possess a same segmentation value as a selected pixel.

7. The method of claim 6 wherein said low-pass filtering is operable to calculate a second average value over a non-peer group, wherein said non-peer group is each pixel within said filter kernel that does not possess the same segmentation value as the selected pixel.

8. The method of claim 7 wherein said image mask is a matrix of values with each value being a function of at least said first average value and said second average value.

9. The method of claim 1 wherein said enhancing tone reproduction comprising:
applying a seed value that is operable to affect a global modification of tone reproduction.

10. The method of claim 9 wherein said seed value is selected by a region of interest algorithm.

11. A computer-readable medium comprising executable instructions for processing a digital image, wherein said digital image comprises at least a gray-scale component and a chromatic component, comprising:
code for applying open and close morphological filters to said gray-scale component to produce a segmentation result;
code for low-pass filtering said gray-scale component to produce an image mask, wherein said code for low-pass filtering is operable to apply said low-pass filter under control of at least said segmentation result; and
code for enhancing said gray-scale component by utilizing at least said image mask and the chromatic component.

12. The computer readable-medium of claim 11 wherein said code for enhancing said gray-scale component further utilizes a seed value that is controllable by a user.

13. The computer-readable medium of claim 11 further comprising:
code for decomposing said gray-scale component into a plurality of binary images that is operable before said code for applying.

14. The computer-readable medium of claim 11 further comprising:
code for quantizing said gray-scale component that is operable before said code for applying.

15. The computer-readable medium of claim 11 wherein said code for low-pass filtering determines a peer group and a non-peer group for each pixel, wherein said peer group is defined by the pixels within a filter kernel that possess a same segmentation value as the respective pixel and said non-peer group is defined by the other pixels with said filter kernel.

16. The computer-readable medium of claim 15 wherein said code for filtering calculates a first average value over said peer group and a second average value of said non-peer group.

17. The computer-readable medium of claim 16 wherein said image mask is a matrix of values with each value being a function of a respective first average value and a respective second average value.

18. A system for processing a digital image, wherein said digital image comprises at least a gray-scale component and a chromatic component, comprising:
means for morphologically filtering said gray-scale component to produce a segmentation data structure;
means for low-pass filtering said gray-scale component to produce an image mask, wherein said means for low-pass filtering operates under control of at least said segmentation data structure; and
means for enhancing tone reproduction of gray-scale component utilizing at least said image mask and the chromatic component.

19. The system of claim 18 wherein said means for enhancing further utilizes a seed value to enhance tone reproduction of said gray-scale component.

20. The system of claim 18 wherein said means for low-pass filtering is operable to calculate a first avenge value for a pea group of a pixel and a second avenge value of a non-peer group of said pixel.

21. The system of claim 20 wherein said means for low-pass filtering is operable to filter said pixel based on a function of at least said first average value and said second avenge value.

22. The system of claim 21 further comprising:
means for decomposing said gray-scale component into a plurality of binary images before said means far morphologically filtering is operable.

* * * * *

UNITED STATES PATENT AND TRADEMARK OFFICE
CERTIFICATE OF CORRECTION

PATENT NO. : 7,031,549 B2
APPLICATION NO. : 10/080890
DATED : April 18, 2006
INVENTOR(S) : Huitao Luo It is certified that error appears in the above-identified patent and that said Letters Patent is hereby corrected as shown below:

In column 4, line 33, delete "$R(x,y)=\max\{i\ t_i:B'_i(x,y)=1\}$" and insert -- $R(x,y)=\max\{t_i:B'_1(x,y)=1\}$ --, therefor.

In column 8, line 32, in Claim 20, delete "avenge" and insert -- average --, therefor.

In column 8, line 33, in Claim 20, delete "pea" and insert -- peer --, therefor.

In column 8, line 33, in Claim 20, delete "avenge" and insert -- average --, therefor.

In column 8, line 39, in Claim 21, delete "avenge" and insert -- average --, therefor.

In column 8, line 42, in Claim 22, delete "far" and insert -- for --, therefor.

Signed and Sealed this

Twelfth Day of January, 2010

David J. Kappos
*Director of the United States Patent and Trademark Office*